United States Patent [19]
Abel et al.

[11] 3,712,232
[45] Jan. 23, 1973

[54] VARIABLE DELAY FUSE FOR AIRCRAFT PARACHUTE FLARE

[75] Inventors: Carroll Abel, Shoals; John R. Clifton, Bedford; James R. Lueking, Bloomfield, all of Ind.

[73] Assignee: The United States of America as represented by the Secretary of the Navy

[22] Filed: Oct. 23, 1968

[21] Appl. No.: 769,999

[52] U.S. Cl.................102/85.2, 89/1.5 D, 102/35.6, 102/85.6
[51] Int. Cl................................F42c 9/10
[58] Field of Search...............102/85.2, 85.6, 35.6; 89/1.5 D

[56] References Cited

UNITED STATES PATENTS

| | | | |
|---|---|---|---|
| 1,385,759 | 7/1921 | Sutton | 102/85.2 |
| 1,988,446 | 1/1935 | Fischer | 102/85.2 X |
| 3,426,683 | 2/1969 | Schenk et al. | 102/35.6 X |

*Primary Examiner*—Samuel W. Engle
*Attorney*—Edgar J. Brower, H. H. Losche and Paul S. Collignon

[57] ABSTRACT

A fuse and ejection device for an aircraft parachute flare having an expellant charge for separating a parachute and flare from an outer container, a stationarily mounted delay fuse for igniting the expellant charge, and a rotatable triggering device for selectively igniting different lengths of the delay fuse whereby the time of free fall of the parachute and flare within the outer container can be varied. A safety locking ring is provided to prevent accidental triggering of the expellant charge and the safety locking ring is first removed by the pull of a lanyard secured to a launching aircraft and then the lanyard pulls a disconnect pin which actuates the triggering device.

2 Claims, 9 Drawing Figures

PATENTED JAN 23 1973

INVENTORS
CARROLL ABEL
JOHN R. CLIFTON
JAMES R. LUEKING

BY H. H. Losche
Paul S. Collignon

ATTORNEYS

INVENTORS
CARROLL ABEL
JOHN R. CLIFTON
JAMES R. LUEKING
BY H. H. Losche
Paul S. Collignon
ATTORNEYS

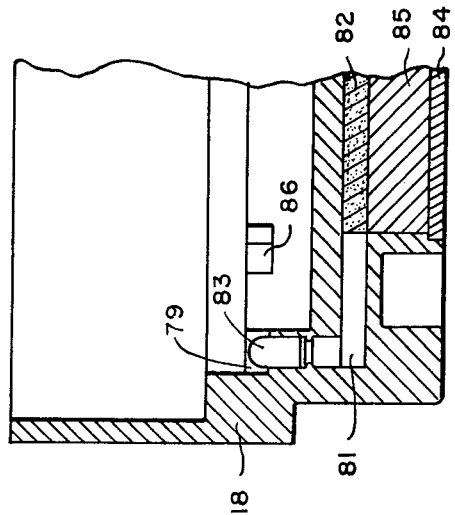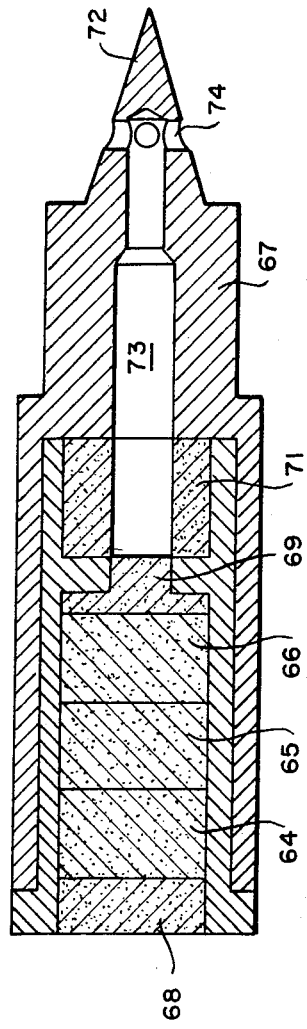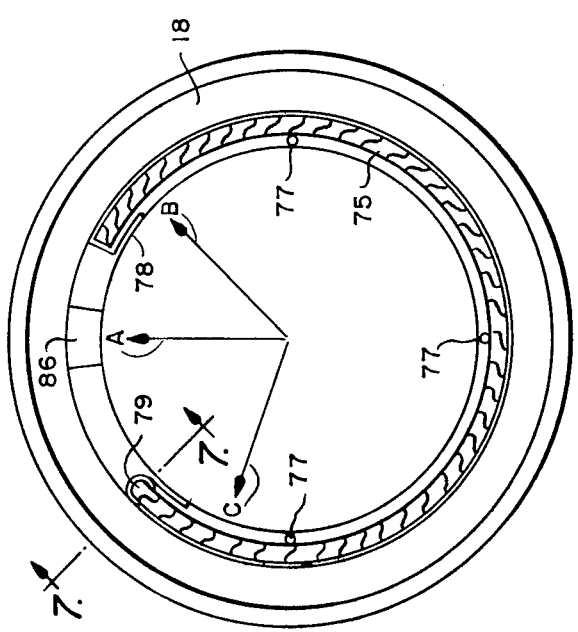

VARIABLE DELAY FUSE FOR AIRCRAFT PARACHUTE FLARE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a delay fuse for an aircraft parachute flare and more particularly to a delay fuse having improved reliability and safety features.

An aircraft parachute flare is normally provided with three sections or components, namely a parachute, a section containing a pyrotechnic composition and a triggering mechanism. The triggering mechanism, in addition to igniting the pyrotechnic composition, frequently provides for a delay period so that the aircraft parachute flare can free fall a predetermined distance prior to parachute opening. This free fall feature permits the aircraft parachute flare to be launched or dropped from relatively high altitudes, but prevents ignition of the pyrotechnic composition until the parachute flare is at an altitude such that light from the flare will illuminate the ground below.

Various mechanisms and devices have heretofore been employed to provide a delay period between time of launch and ignition of the pyrotechnic composition. One mechanical device is shown in U.S. Pat. No. 2,144,056, which issued Jan. 17, 1939, to Ralph Halbach. In this patented device, a timing arrangement utilizing a standard clock mechanism is employed to actuate a locking bolt to produce an opening of the parachute casing whereupon the parachute is permitted to open and the flare is ignited.

Another type of timing mechanism is shown and described in U.S. Pat. No. 1,346,454, which issued July 13, 1920, to Harold Holt. In this timing mechanism a fuse is provided which has a fixed cap and base member with an intermediate member containing fuse material. The intermediate member is rotatable to provide different length of communication paths between an electric igniter and a quick match element which ignites the illuminating material.

As an aircraft parachute flare is an expendable item, possibly the most important features on these flares are the safety features which attempt to prevent accidental or premature ignition of the pyrotechnic composition. As the illuminating materials which are used in present day flares provide extreme heat upon burning, any accidental ignition of these flares could result in a catastrophic disaster, particularly if the flares are in storage aboard a ship. In order to provide some measure of safety, most present day flares are provided with a safety pin which is kept in position until the flare is mounted in a launching rack on an aircraft. In the event the aircraft returns with flares, the safety pins are reinserted.

SUMMARY OF THE INVENTION

The present invention relates to a variable delay fuse which is removably attached to an aircraft flare and which provides an adjustable delay period prior to initiating parachute opening and ignition of an illuminating composition. The variable delay fuse is provided with a safety locking ring which remains in position until the aircraft parachute flare is launched from an aircraft whereupon a lanyard attached to the aircraft causes the safety locking ring to be first removed and then the lanyard actuates a triggering means. The triggering means is rotatable relative to a stationarily attached fuse cord whereby different lengths of fuse cord can be ignited to provide different delay periods between time of launch and ignition of the illuminating composition. A safe position is provided for the triggering means and, when in this safe position, any accidental release of the triggering means will not ignite the fuse cord.

It is therefore a general object of the present invention to provide a fuse assembly which is removably attached to an aircraft parachute flare whereby the fuse can be stored separately from the illuminating composition and can be quickly assembled prior to use.

Other objects and advantages of the present invention will be readily appreciated as the same becomes better understood by reference to the following detailed description when considered in connection with the accompanying drawings.

BRIEF DESCRIPTION OF THE DRAWINGS

FIG. 6 is a top plan view of a fuse housing;

FIG. 7 is a partial sectional view taken on line 7—7 of FIG. 6;

FIG. 8 is a sectional view showing an ejection plunger having delay elements.

DESCRIPTION OF THE PREFERRED EMBODIMENT

Figures 1, 5, 9:
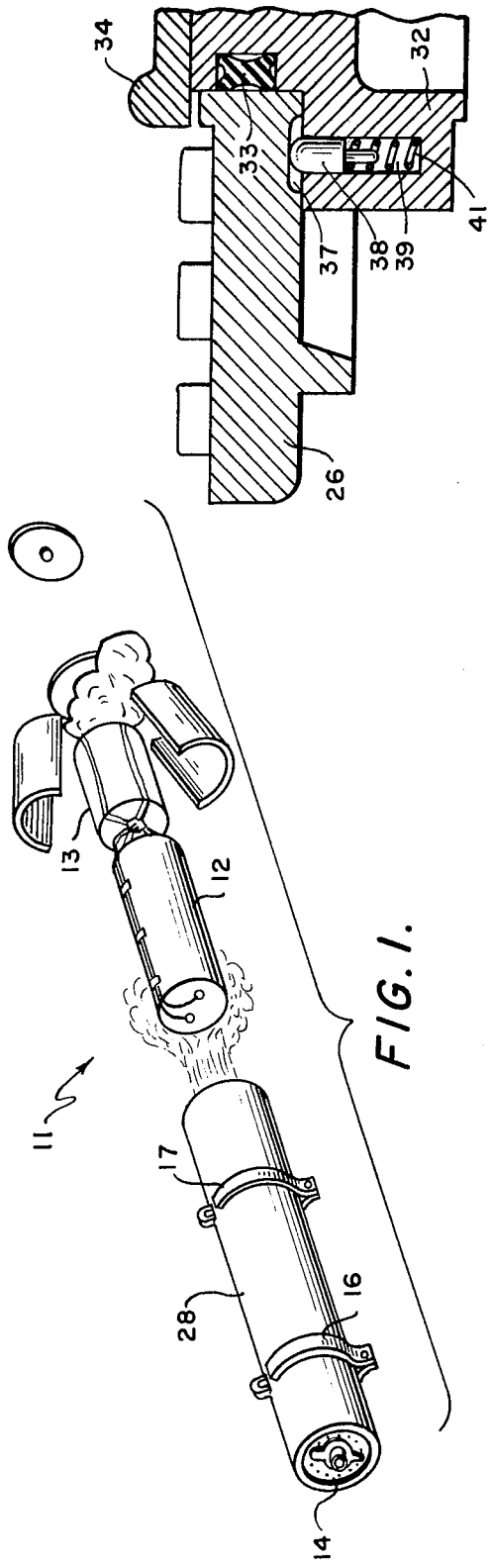
FIG. 1 is a diagrammatic view showing a parachute flare being ejected from its case.
FIG. 5 is a partial sectional view taken on line 5—5 of FIG. 2 and showing a detent arrangement.
FIG. 9 is a plan view showing a lanyard assembly.

Referring first to FIG. 1 of the drawings, there is shown an aircraft parachute flare 11 which is in process of being opened. Basically, an aircraft parachute flare is comprised of a flare composition section 12 which contains an illuminating material, a parachute section 13, and a fuse section 14. The flare composition section 12 and parachute section 13 are contained in a container 28, to which the fuse section 14 is attached through adapter housing 15. Container 28 is attached to a launcher on an aircraft by means of brackets 16 and 17.

Figure 4:
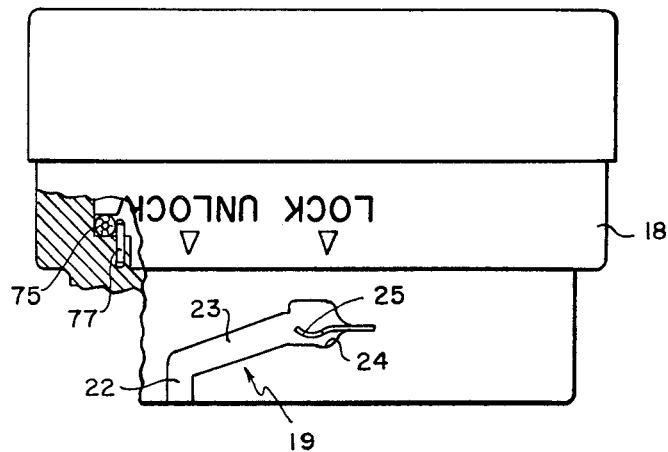
FIG. 4 is a side view of a fuse housing showing locking slots.
Figure 3:
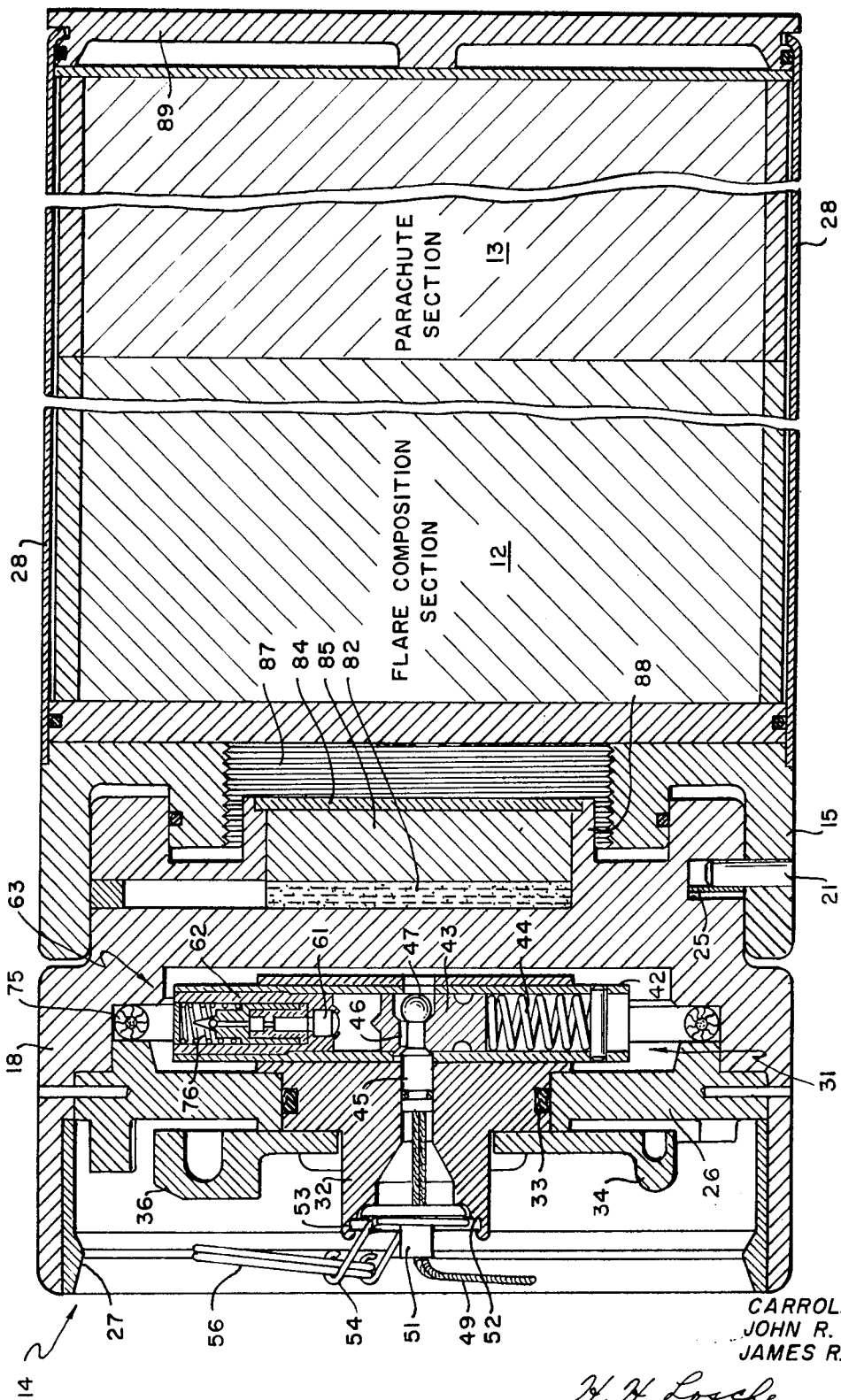
FIG. 3 is a longitudinal sectional view of a preferred embodiment of the present invention.

Referring now to FIGS. 3 and 4 of the drawings, it can be seen that fuse case 18 is provided with grooves 19 which engage with pins 21 in adapter housing 15 so that fuse section 14 can be removably attached to adapter housing 15. By way of example, three equally spaced grooves 19 might be provided in fuze case 18, with each groove being provided with a vertical portion 22, a slanted portion 23, and a radiused seat portion 24.

A leaf spring 25 is attached to fuse case 18 adjacent each seat portion 24 to provide a locking force against fuse pins 21. When attaching fuse section 14 to adapter housing 15, pins 21 are first engaged in vertical portion 22 of grooves 19, and then fuse case 18 is rotated so that pins 21 are then engaged in slanted portion 23 thereby drawing together fuse case 18 with adapter housing 15. Pins 21 then become seated in radiused seat portion 24, and leaf springs 25 provide an additional holding force against pins 21. By providing a strong torque to fuse case 18, however, while holding adapter housing 15 against rotation, fuse section 14 can be removed, if desired.

Figure 2:
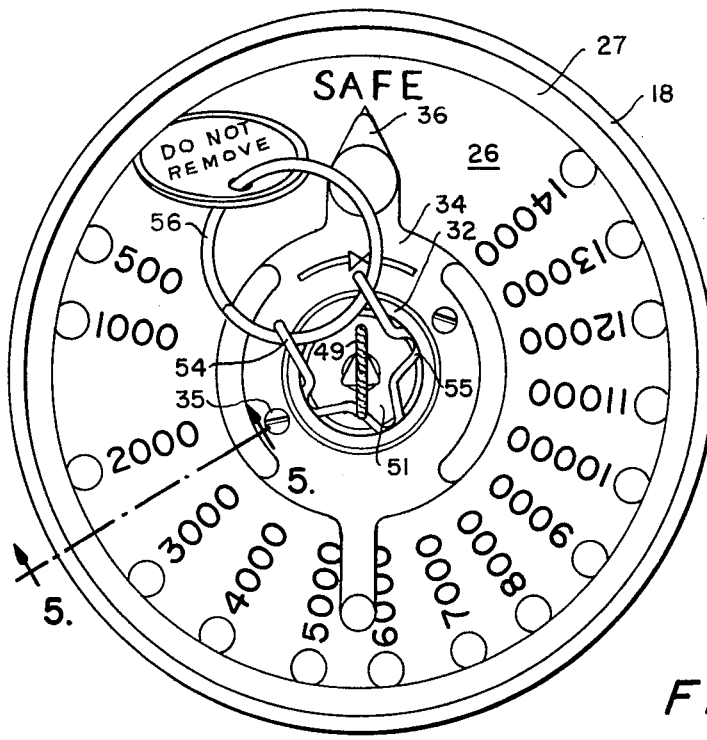
FIG. 2 is a top plan view of a preferred embodiment of the present invention.

As best shown in FIGS. 2 and 3 of the drawings, a dial plate 26 is provided in fuse case 18 and indicia on dial plate 26 indicates setting which provide different free fall distances before parachute opening is initiated. Dial plate 26 is maintained in position by locking ring 27 which is secured to fuse case 18 by any conventional means, such as screws or adhesive. A trigger assembly 31 is rotatably attached to dial plate 26 by means of a rotor 32 which is fitted in a hole in dial plate 26. A resilient ring 33 is provided on the outer circumference of rotor 32 to provide a seal against moisture. An indicator knob 34 is attached to rotor 32 by means of screws 35 and knob 34 is provided with a pointer 36 which points to the selected indicia on dial plate 26. As shown in FIG. 5 of the drawings, dial plate 26 is provided with a plurality of indentations 37 on the bottom side thereof, there being one indentation for each position of indicia which is shown on the top of dial plate 26. A detent 38 is provided in hole 39 in rotor 32 and spring 41 biases detent 38 against the bottom of dial plate 26 so that detent 38 can selectively engage different indentations 37.

A firing pin housing 42 is attached to rotor 32 and firing pin 43 is slidably mounted in housing 42. Helical spring 44 provided the driving force for firing pin 43. Firing pin 43 is retained in a cocked position by pull pin 45 which engages in an elongated slot 46 in firing pin 43. Pull pin 45 is provided with a spherical end 47 and it can be seen that, in order to remove pull pin 45 from elongated slot 46, spherical end 47 causes firing pin 43 to move a very short distance backwards, thereby compressing helical spring 44 an additional distance. It is this elongated slot 46 and spherical end 47 arrangement that provides an extra large pulling force to remove pull pin 45, thereby preventing accidental release of firing pin 43. A short cable 48 is attached to the upper end of pull pin 45 with cable 48 being doubled to form a loop 49 on the outer end. A toggle 51 is staked to cable 48, and a seat 52 is provided in rotor 32 for seating toggle 51. A retaining groove 53 is provided adjacent seat 52, and a safety locking ring 54 is engageable in groove 53 to secure toggle 51 to rotor 32 and, consequently, to secure pull pin 45 in slot 46 of firing pin 43. As best shown in FIG. 2 of the drawings, locking ring 54 is provided with three nodes 55 which are positioned approximately 90° apart. Nodes 55 are engageable in groove 53. The ends of locking ring 54 are attached to an annual ring 56 and, by pulling on ring 56, nodes 55 can be removed from groove 53.

A primer 61 is positioned in a holder 62 which is mounted in housing 42, and also a fixed delay and ejection triggering mechanism 63 is provided in holder 62.

As best shown in FIG. 8 of the drawings, three delay increments 64, 65, and 66 are provided within an ejection plunger 67 and are ignited when primer 61 is detonated and ignites ignition powder 68. The delay increments, in turn, ignite black powder charge 69 and an annular ring 71 of black powder. By way of example, delay increments 64, 65, and 66 might be comprised, by weight, of 61 percent of barium chromate, 13 percent of potassium perchlorate, and 26 percent of a powdered alloy consisting of 70 percent zirconium and 30 percent nickel. Ejection plunger 67 is provided with a pointed forward end 72 and a bore 73 provides a passageway so that heat and flame from annular ring of black powder 71 can pass into the forward end and exit through a plurality of holes 74 in pointed end 72 to ignite a time delay fuse 75. A very weak spring 76 is provided within holder 62 to prevent ejection plunger 67 from engaging time delay fuse 75 until firing pin 43 strikes primer 61.

As best seen in FIGS. 6 and 7 of the drawings, time delay fuse 75 is positioned in an arc around an inner peripheral edge of fuse case 18. A plurality of dowel pins 77 are provided in fuse case 18 to maintain time delay fuse 75 in a circular position. The beginning of time delay fuse 75 is positioned by a flange 78 which can be made integral with fuse case 18. The terminal end of fuse 75 passes through a hole 79, and a passageway 81 connects hole 79 with a quantity of ejection powder 82. A ferrule 83 is provided on the terminal end of fuse 75 in order to maintain fuse 75 in position in hole 79. An end cap 84 and spacer 85 are provided to enclose ejection powder 82 so that it will not be affected by moisture and the like. As shown in FIG. 6 of the drawings, arrow A indicates the direction which the pointed end 72 of ejection plunger 67 is pointing when pointer 36 shows a "safe" position. It can be seen that if the device is accidentally fired, the time fuse 75 will not be ignited. A slot 86 is provided to shield fuse 75 from any flame and heat coming through holes 74 in the event fuse section 14 is triggered while in a "safe" position. Arrow B indicates the direction which the pointed end 72 of ejection plunger 67 is pointing when the pointer 36 shows a "14,000" feet position, and it can be seen a considerable delay will be provided while a long length of time fuse 75 burns. Arrow C indicates the direction which pointed end 72 of ejection plunger 67 is pointing when pointer 36 shows a "500" feet position, and it can be seen that a very short length of fuse 75 will burn.

Housing 15 is provided with an aperture 87 and a center portion 88 of fuse case 18 extends into aperture 18. It is in this center portion 88 that ejection powder 82 and end cap 84 are contained, and the explosive force from the detonation of powder 82 will be channeled through aperture 87 to blow out end closure 89 and expel flare composition section 12 and parachute section 13 from outer container 28. Aperture 87 is threaded so that when fuse case 18 is not attached to adapter housing 15, a plug can be threaded into aperture 87 to prevent moisture and dirt from entering into flare composition section 12.

FIG. 9 of the drawings shows a lanyard cable 91 to which a swivel loop 92 is provided for fastening to an aircraft. A snap 93 is provided on the other end of cable 91 and is engageable with loop 49 of cable 48, and a loop 94 in lanyard cable 91 is provided to engage ring 56.

OPERATION

For maximum safety, fuse section 14 is not assembled to the aircraft parachute flare 11 until the flare is to be put into use. When it is desired to mate fuse section 14 to adapter housing 15, any plug which is threaded into aperture 87 must be removed. Also locking ring 54 should be in position and indicator knob 34 should be rotated until pointer 36 is indicating a "safe" position, as shown in FIG. 2 of the drawing. Fuse section 14 can then be mated with adapter housing 15 by engaging pins 21 in adapter housing 15 with grooves 19 in fuse case 18 and rotating fuse case 18 so that pins 21 will be seated in radiused seat portions 24.

Immediately prior to mounting the aircraft parachute flare 11 to the launcher on an aircraft, indicator knob 34 is turned so that pointer 36 will indicate the desired free fall distance. For example, with pointer 36 pointing to "4000," the aircraft parachute flare will fall approximately 4,000 feet, before the flare composition section 12 and parachute section 13 will be ejected from container 28. Upon aircraft parachute flare 11 being mounted to a launcher on an aircraft, snap 93 of the lanyard is attached to loop 49 of cable 48 and ring 56 is attached to loop 94 of the lanyard. The length of the lanyard cable 91 between loop 94 and snap 93 is such that a pull on cable 91 will first cause ring 56 to be pulled, which in turn causes locking ring 54 to be removed from retaining groove 53 and then, after locking ring 54 has been removed, the pulling force of the lanyard cable will be applied to loop 49 and pull pin 45 will be withdrawn to release firing pin 43.

With pull pin 45 having cleared firing pin 43, spring 44 will drive firing pin 43 into primer 61 which, upon detonation, drives ejection plunger outwardly, whereupon pointed end 72 of ejection plunger 67 becomes embedded in time delay fuse 75. Detonation of primer 61 causes black powder charge 68 to be ignited which, in turn, causes delay elements 64, 65, and 66 to be ignited. These delay elements cause about a 2-second delay before powder charges 69 and 71 are ignited. The heat and flame from the burning of powder charge 71 pass through bore 73 and out of holes 74 in pointed end 72 of ejection plunger 67 and cause time delay fuse 75 to be ignited. Time delay fuse 75, in turn, causes ejection powder 82 to be detonated whereupon end cap 84 and spacer 85 are forced out, and also end closure 89 is blown out, and flare composition section 12 and parachute section 13 are ejected from container 28.

It can thus be seen that the present invention provides an improved variable delay fuse for an aircraft parachute flare which has improved safety features to prevent an accidental ignition of the pyrotechnic material inside the flare. Obviously many modifications and variations of the present invention are possible in the light of the above teachings.

We claim:

1. A variable delay fuse and ejection device for ejecting a flare and parachute from an outer container having plurality of attaching pins thereon comprising, a fuse case having a plurality of grooves which are engageable one each with the plurality of attaching pins on said outer container and said fuze case having a plurality of indentations on one surface thereof, a rotor rotatably mounted to said fuse case and provided with a spring-biased detent which is selectively engageable with said indentations, a charge of powder in said fuse case, a time delay fuse positioned in an arc within said case for igniting said charge of powder, trigger mechanism attached to said rotor and adaptable for igniting said time delay fuse at selected positions, said trigger mechanism including a firing pin, spring means for driving said firing pin, a pull pin engageable with said rotor and said firing pin for holding said firing pin in a cocked position and ignition means for igniting said time delay fuze upon triggering of said firing pin, and means for locking said trigger mechanism.

2. A variable delay fuse and ejection device as set forth in claim 1 wherein said means for locking said trigger mechanism includes a locking ring engageable with said rotor for preventing removal of said pull pin.

* * * * *